United States Patent [19]

Schultz

[11] 4,173,244

[45] Nov. 6, 1979

[54] ANTI-SKID VEHICLE TIRE CHAINS

[76] Inventor: Edwin R. Schultz, 2920 Rhett Dr., Xenia, Ohio 45385

[21] Appl. No.: 817,449

[22] Filed: Jul. 20, 1977

Related U.S. Application Data

[63] Continuation-in-part of Ser. No. 628,742, Nov. 4, 1975, abandoned.

[51] Int. Cl.² .............................................. B60C 27/12
[52] U.S. Cl. .................................... 152/218; 152/231
[58] Field of Search .............. 152/217, 218, 219, 231, 152/239, 240, 241, 213 R, 213 A

[56] References Cited

U.S. PATENT DOCUMENTS

| 1,042,722 | 10/1921 | Simmons | 152/240 |
| 2,082,937 | 6/1937 | Bambenek | 152/213 A |
| 3,095,025 | 6/1963 | Rhodes | 152/241 |
| 3,181,586 | 5/1965 | Skrip | 152/241 |
| 3,856,069 | 12/1974 | Giannone | 152/217 X |

Primary Examiner—Robert J. Spar
Assistant Examiner—Francis J. Bartuska
Attorney, Agent, or Firm—Shanley, O'Neil and Baker

[57] ABSTRACT

A vehicle tire chain which will fit different size tires and can be installed without moving the vehicle wheel, a single adjustable tension member acting to accommodate the tire chain to different size tires and wheels.

1 Claim, 6 Drawing Figures

ANTI-SKID VEHICLE TIRE CHAINS

RELATED APPLICATION

This application is a continuation-in-part of application Ser. No. 628,742, filed Nov. 4, 1975, and now abandoned.

BACKGROUND OF THE INVENTION

The magnitude of the problem relative to adapting vehicle tire chains to a wide variation of tire sizes can be appreciated by examining the existing ranges in tire sizes and compatible snow chains. One current tire suppliers lists 82 different tire sizes and 7 tire chain categories to cover the tire size range. Another supplier presents 80 tire sizes and 9 tire chain categories. A foreign manufacturer supplies 14 different tire chain categories to cover the several diameter European wheels. Thus it can be seen that manufacturers must fabricate a wide spread of snow chain sizes and retailers must maintain a large inventory of different size chains, all of which is very undesirable.

The present invention provides a tire chain system that can inherently be adapted to a wide range of tire sizes due to unique means for adjusting the chains.

The basic nature of tire chains is such that the chains often must be installed after the vehicle is stuck in the snow or slush. However, the most popular types of tire chains require that the chains be arranged on the ground parallel to the direction of the vehicle in motion, one end of the chain be clamped to the tire and the car be driven a correct short distance to bring the chain up over the upper portion of the tire. The two loose ends of the chain must then be joined together by lying in the snow or slush and reaching around the tire to join the appropriate hooks or snaps. It will be apparent that this operation is impracticable for a vehicle already stuck in snow or slush and at best quite difficult and messy when performed in typically inclement weather prevalent when tire chains are required.

Tire chains attempting to solve the foregoing problems have been proposed in the past but all the forms so proposed have presented formidable difficulties to the person attempting to install them. This is because prior to installation the diverse elements making up these chains presented a Chinese puzzle to a person desiring to install them, with free ends and attachments projecting in all directions. On the other hand, the tire chain of the present invention can be laid out on the ground in front of the wheel to which the tire chain is to be applied with all but one of the connections among the various parts already made, there being merely one connection to make and one element to adjust in length in order to completely encase the wheel and tire with the tire chain.

The present invention further contemplates a simplified concept suitable for marketing in kit form where the purchaser is not adverse to connecting the components to arrive at a completed but more economical form of the invention.

SUMMARY OF THE INVENTION

A tire chain comprising a main component made up of a long flexible tension member including first, second, third, fourth, fifth and sixth links all spaced from one another along the length of the main component, connecting means at each end of the main component, one connecting means being connected to the first link so as to form a short loop of flexible tension member closed by a short section of flexible tension member, the fourth link being located in the short loop intermediate the first and second links, the second connecting means being connected to the second link of the main component so as to form between the first link and the second link a long loop of flexible tension member closed by the short section of flexible tension member, the third and fourth links being located in the long loop and the sixth link being located in the long loop intermediate the third and fourth links, a rigid rod pivotally connected to the third link, disconnectable connecting means associated with the opposite end portion of the rigid rod for connection with the fourth link, a tension member of adjustable length having means at one end portion for connection to the fifth link, and means associated with the other end portion of the tension member of adjustable length for connection with the sixth link.

A tire chain component comprising a length of chain made up of a series of permanently connected links, a disconnectable connecting means at each end of the length of chain, each disconnectable connecting means being connectable and disconnectable to any one of the links of the length of chain, means identifying a first link of the length of chain to which one disconnectable connecting means can be connected so as to form a short loop of the length of chain closed by a short section of the length of chain, means identifying a second link of the length of chain to which the other disconnectable connecting means can be connected so as to form between the first link and the second link a long loop of the length of chain closed by the short section of the length of chain, means identifying a third link located in the long loop of the length of chain to which one end portion of a rigid rod can be pivotally connected, means identifying a fourth link located in the long loop of the length of chain to which an opposite end portion of the rigid rod can be disconnectably connected, means identifying a fifth link of the length of chain to which one end portion of a tension member of adjustable length can be connected, means identifying a sixth link of the length of chain to which the other end portion of the tension member of adjustable length can be connected, the fifth and sixth links being located one in each of the short loop and the long loop at a point in each loop intermediate the first and second links, the third and fourth links being located in the long loop of the length of chain with one on each side of the link connected to the tension member and at points intermediate said last mentioned link and the first link and the second link, respectively.

BRIEF DESCRIPTION OF THE DRAWINGS

A preferred embodiment of the invention is disclosed in the accompanying drawings in which.

DESCRIPTION OF THE PREFERRED EMBODIMENTS

Figure 1:
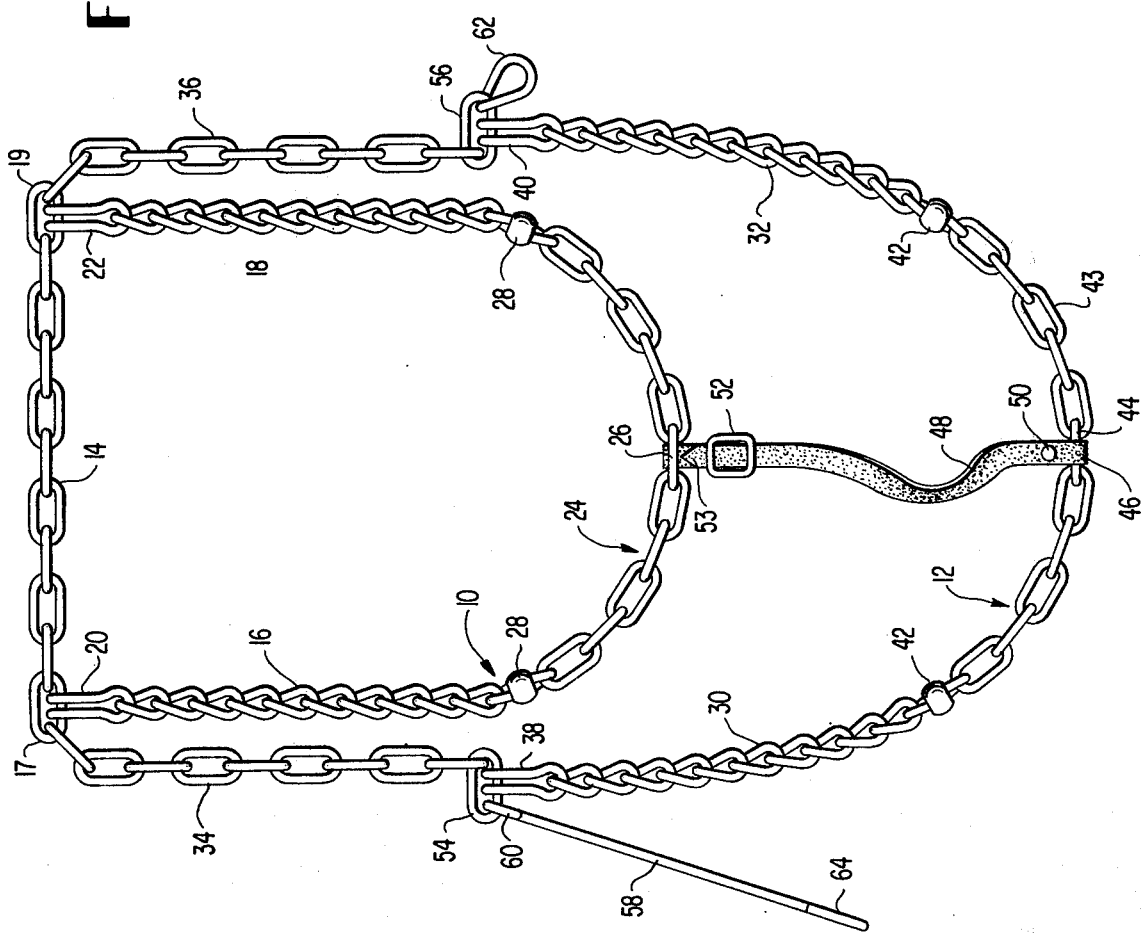
FIG. 1 is a plan view of the tire chain as it would be laid out on the ground adjacent to a vehicle tire as the first step in installation.

As will be apparent from FIG. 1, the preferred embodiment of the tire chain of the present invention is made up of a short open ended loop of continuous and uninterrupted chain indicated generally at 10 and a long open ended loop of continuous and uninterrupted chain indicated generally at 12, the open ends of both loops being closed by a single common section of chain indicated at 14.

The short loop of chain is made up of similar road contact chain sections 16 and 18 which are contiguous to chain section 14 and joined to the two end links 17, 19 thereof by conventional connection links 20 and 22. The opposite ends of road contact chain sections 16 and 18 are connected by a chain section indicated generally at 24 which includes a link 26 intermediate the ends thereof. At the lower end of each road contact chain section 16 and 18, as viewed in FIG. 1, there is a bright colored marker bead 28 to facilitate installation of the tire chain, as will be described later.

Turning now to the long loop 12, it will be seen that similar road contact chain sections 30 and 32 are connected to the end links 17, 19 of common chain section 14 through the media of chain sections 34 and 36 and conventional connecting links 38 and 40. Again as in the short loop, bright color marker beads 42 are positioned at the lower end of road contact chains 30 and 32 as viewed in FIG. 1. These ends of road contact chains 30 and 32 are connected together by chain section 43. At the intermediate point of the long loop and located in chain section 43, there is a link 44 through which the bight 46 of a belt 48 passes, the bight being closed by a rivet 50. The upper end of belt 48 carries a buckle 52 which receives and holds the free end 53 of belt 48 with the free end passing through link 26 and being doubled back. The belt free end and the buckle cooperate to make the length of the belt between link 44 and link 26 adjustable.

Road contact chain connecting links 38 and 40 of the long loop are connected to links 54 and 56 respectively, these two links each serving a dual purpose by also constituting elements of a connectable-disconnectable mechanism for completing enclosure of the tire by the tire chain. The two parts of this mechanism are made up of an elongated, rigid metal rod 58 pivoted by means of an eye 60 at one end to link 54, and an eye 62 pivotally connected to link 56. Obviously, if desired, link 56 can be used as an eye thereby eliminating the need for eye 62 and link 54 can carry an eye for pivotal connection with eye 60 of rod 58. The free end of rigid rod 58 is in the form of a hook 64, with rod 58 being dimensioned and hook 64 being shaped so that hook 64 and eye 62 (or link 56) can make a connectable and disconnectable connection to complete the enclosure of the tire by the tire chain.

Figure 2:
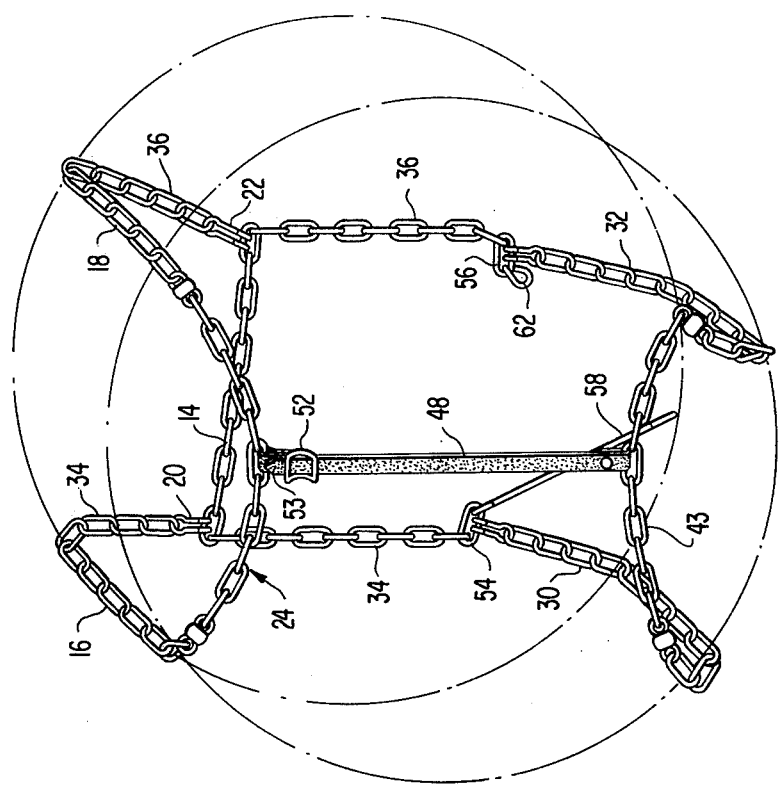
FIG. 2 is a perspective view, with the tire shown in phantom, of the second step in installing the tire chain of the present invention.
Figure 4:
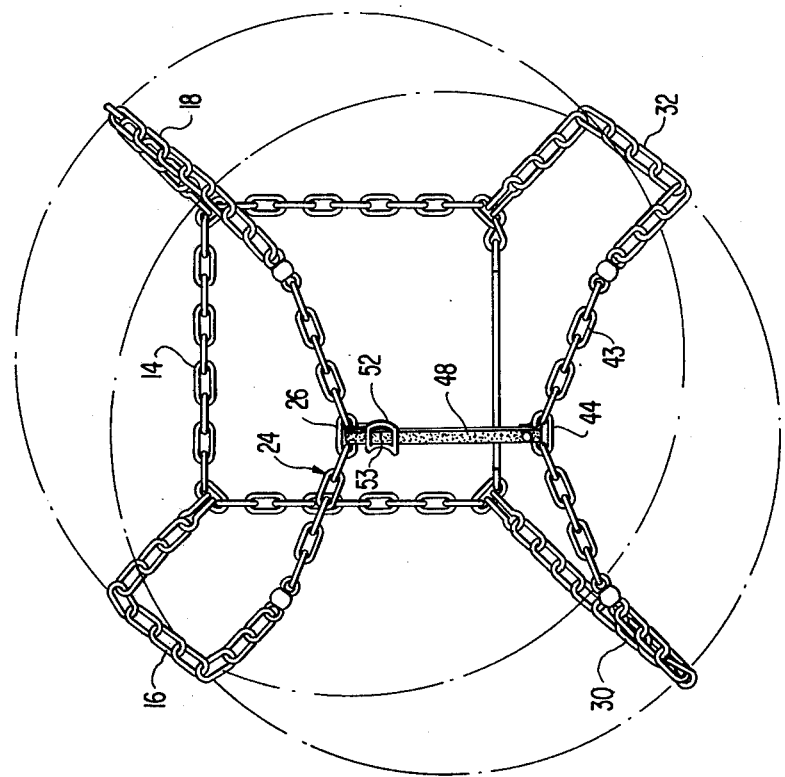
FIG. 4 is a perspective view, with the tire shown in phantom, of the fourth and final step in installing the tire chain of the present invention.
Figure 3:
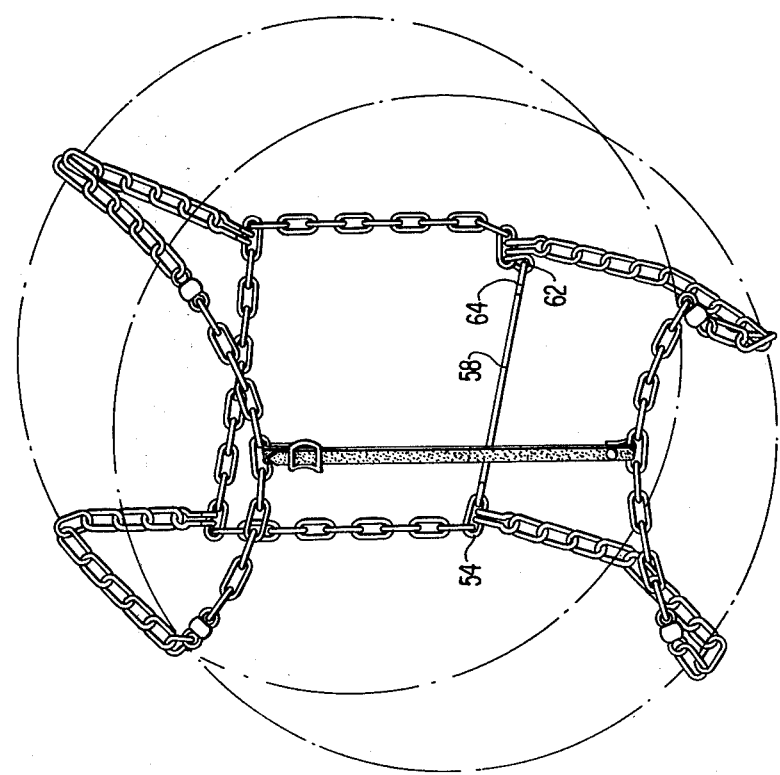
FIG. 3 is a perspective view, with the tire shown in phantom, of the third step in installing the tire chain of the present invention.

The installation of the tire chain of the present invention will now be described in successive references to FIGS. 2, 3 and 4 showing the steps following the step of arranging the tire chain on the ground as illustrated in FIG. 1. In the second installation step, the tire chain may be raised from the ground for positioning on the tire by taking hold of links 17 and 19 and draping road contact chain sections 16 and 18 over the top of the tire in spaced relation to each other, the spacing being determined by the length of chain section 14. Chain sections 34 and 36, together with road contact chain sections 30 and 32, are then moved away from one another so that chain sections 34 and 36 are pushed around the sides of the periphery of the tire and drape themselves back of the tire in the position shown in FIG. 2. Chain section 43 remains in front of the tire. Alternatively, in the first step, chain sections 34 and 36 can be urged around the periphery of the tire at the same time that road contact chain sections 16 and 18 are draped over the top of the tire. It will be apparent in FIG. 2 that in either case the lower road contact chain sections 30 and 32 fall naturally into the position shown in FIG. 2 on either side of the place where the tire makes engagement with the ground and the tire chain is thus in position for enclosing the tire without moving the wheel.

Referring now to FIG. 3, the third step in the installation procedure is for the installer to manipulate rod 58 from the left so that its free or hook end is readily accessible at the rear end and right side of the tire near eye 62. The connection of hook 64 and eye 62 is then made without difficulty.

At this time the end 53 of belt 48 which passes through link 26 and buckle 52 is drawn through the buckle to shorten the belt sufficiently to hold chain sections 24 and 43 in a relationship which will facilitate the positioning of the road contact chain sections 16, 18, 30 and 32 in their final positions.

Referring now to FIG. 4, the fourth and final step in the installation of the tire chain of the present invention is to move road contact chain sections 16, 18, 30 and 32 to their final positions around the periphery of the tire while simply tightening belt 48 thereby bringing it into its final position. The belt end 53 can then be doubled back into a secure connection with buckle 52.

It will be noted that in the rear of the wheel, chain sections 14, 34 and 36 and rod 58 form a square which acts in the rear to hold the road contact chain sections 16, 18, 30 and 32 in their proper positions around the periphery of the tire, while in the front of the wheel middle links 26 and 44 of chain sections 23 and 43 are connected in such a way as to constrain chain sections 24 and 43 to assume the optimum stable, geometric configuration which will accomplish the same purpose in the front of the wheel as the square configuration does in the rear. It will be recognized that the amount of "take up" in belt 48 allows for an appreciable amount of difference in the dimensions of the tires and wheels which can be accommodated by one size of tire chains of the present invention.

Colored market beads 28 and 42 are useful in the second, third and fourth steps of installing the tire chain of the present invention because they stand out to clearly mark the ends of the road contact chains so that these ends can be properly positioned during these installation steps.

Figure 6:
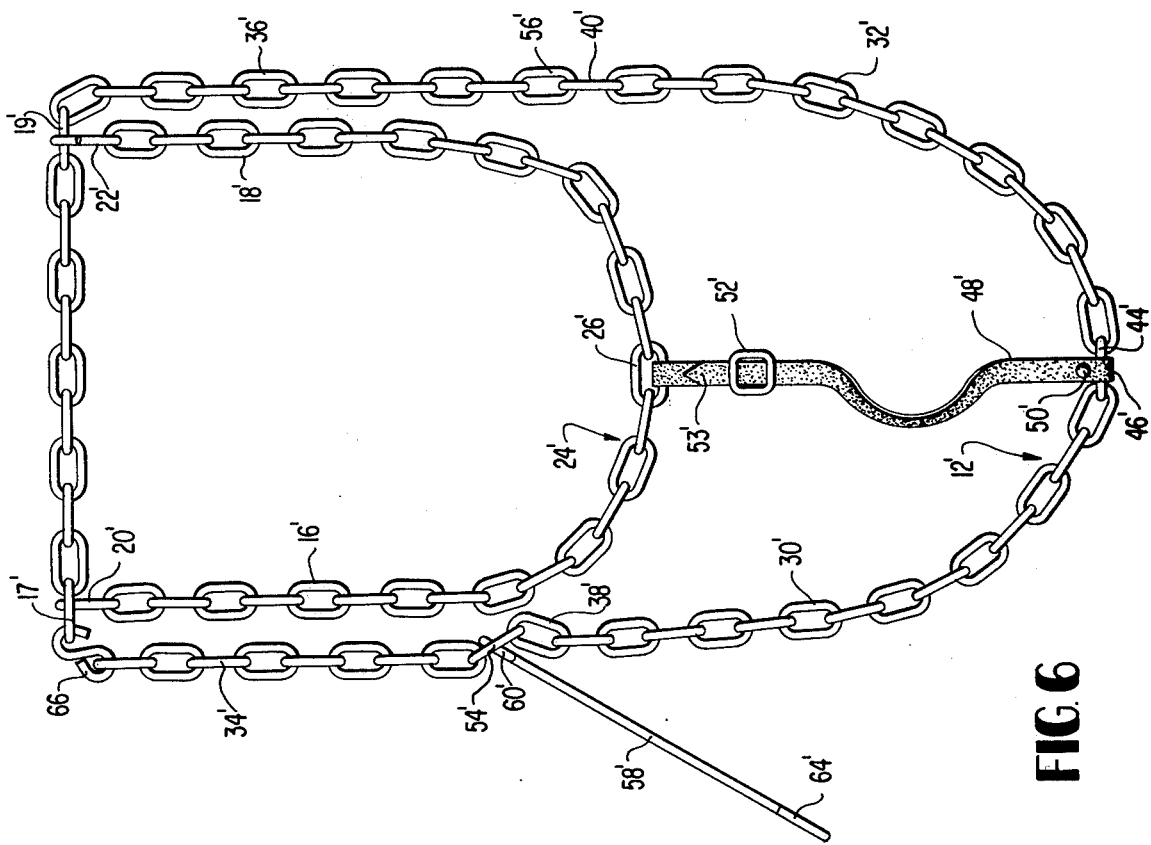
FIG. 6 is a view similar to FIG. 1 of the modification of the present invention in which the components illustrated in FIG. 5 are connected to form a completed tire chain.
Figure 5:
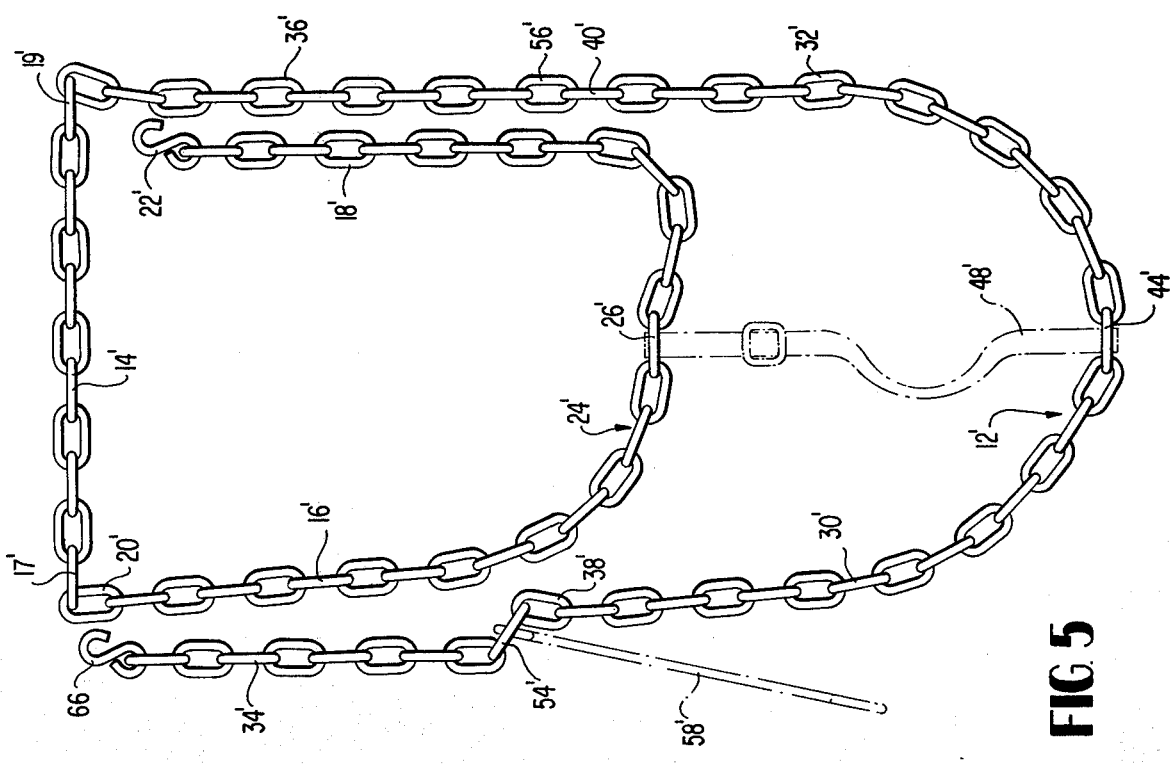
FIG. 5 is a plan view of a tire chain main component with associated components shown in phantom as the main component would be laid out on a flat surface to facilitate assembly of the components into a completed tire chain.

FIGS. 5 and 6 illustrate a modification of the present invention especially suitable to marketing in kit form although obviously the completed tire chain of FIG. 6 can be marketed where a form of the invention more austere than that disclosed in FIGS. 1 to 4 is desired.

In FIGS. 5 and 6, similar parts to those illustrated in FIGS. 1 to 4 are indicated by the same reference numerals but with the reference numerals in the case of FIGS. 5 and 6 being primed, thereby simplifying the description of the modification of FIGS. 5 and 6.

Referring to FIG. 5, the main component of this embodiment of the invention is shown to be a length of chain made up of identical or similar links which are of any form suitable for use as anti-skid tire chains. The two ends of the length of chain terminate in connecting elements 22' and 66 which are so shaped as to be connectable to certain of the links of the length of chain. In view of the description of FIGS. 1 to 4 and the use of similar reference numerals, it will be apparent that the main component of FIG. 5 and the components shown in phantom in FIG. 5 can be assembled as shown in FIG. 6 to form a completed tire chain wherein sections 16', 18', 30' and 32' will act as road contact members when the chain is applied to a tire. In order to facilitate the assembly of the components illustrated in FIG. 5 into the completed tire chain shown in FIG. 6, matching types of identification means can be associated with the elements to be interconnected. For example, first link 19' and connecting member 22' can be colored the same color. In similar manner, second link 17' and connecting member 66 can both be colored a second color and third and fourth links 54' and 56', together with both ends of rigid rod 58' can all be colored a third color. Finally, fifth and sixth links 26' and 44' can both be colored a fourth color to indicate where the end portions of strap 48' are to be connected. If preferred, first link 19' and second link 17', together with connecting members 22' and 66, can all be colored the same color. It will be noted that in the first example the first and second colors together can be said to be a first type of identification means.

It will be understood that except in respect to the embodiments of FIGS. 5 and 6, although the term chain is used throughout this specification and appended claims, any tensile elements can be used with flexibility being desirable in the several road engaging chain sections and although members 48 and 48' are referred to as a belt, any suitable, adjustable tension element can be substituted which may or may not be flexible and/or elastic.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

I claim:
1. A tire chain device comprising
   (a) a continuous length of chain made up of a series of permanently connected identical links,
   (b) a disconnectable connecting means at each end of the length of chain, each disconnectable connecting means being connectable and disconnectable to any one of the links of the length of chain,
   (c) first color identification means associated with one of the two disconnectable connecting means and with a first link of the length of chain to which the one disconnectable connecting means can be connected so as to form a short loop of the length of chain closed by a short section of the length of chain,
   (d) second color identification means associated with the other of the two disconnectable connecting means and with a second link of the length of chain to which the other disconnectable connecting means can be connected so as to form between the first link and the second link a long loop of the length of chain also closed by the short section of the length of chain,
   (e) a rigid rod having disconnectable connection means at one end for disconnectable connection to any link of the chain,
   (f) means pivotally connecting the other end of the rigid rod to a third link, the third link being located at an intermediate point on one side of the long loop of the length of chain,
   (g) third color identification means associated with the disconnectable connection means of the rigid rod and with a fourth link located at an intermediate point on the other side of the long loop of the length of chain to which fourth link the disconnectable connection means of the rigid rod can be disconnectably connected,
   (h) a tension member of adjustable length having disconnectable connection means at one end portion,
   (i) means for connecting the other end portion of the tension member to a fifth link in the length of chain, the fifth link being located at a midpoint in one of the two loops of chain, and
   (j) fourth color identification means associated with a sixth link of the length of chain to which sixth link the other end portion of the tension member of adjustable length can be connected, the sixth link being located at a midpoint in the other of the two loops of chain.

* * * * *